United States Patent
Latiri

(10) Patent No.: US 7,263,866 B2
(45) Date of Patent: Sep. 4, 2007

(54) GOLF CLUB HOSEL BENDING FIXTURE

(76) Inventor: Mondher Latiri, 781 Fong Lin Road., Sec. 4, Ta-Liao, 831, Kaohsiung (TW)

( * ) Notice: Subject to any disclaimer, the term of this patent is extended or adjusted under 35 U.S.C. 154(b) by 119 days.

(21) Appl. No.: 11/190,000

(22) Filed: Jul. 27, 2005

(65) Prior Publication Data
US 2007/0022799 A1 Feb. 1, 2007

(51) Int. Cl.
*B21C 51/00* (2006.01)
(52) U.S. Cl. .............. 72/31.02; 72/316; 73/65.03; 33/508
(58) Field of Classification Search ............ 72/293, 72/316, 31.1, 31.01, 31.02; 33/508, 534; 269/909; 73/65.03
See application file for complete search history.

(56) References Cited

U.S. PATENT DOCUMENTS

| | | | |
|---|---|---|---|
| 3,357,219 A * | 12/1967 | Hunter | 72/31.02 |
| 3,965,714 A | 6/1976 | Beard | |
| 4,094,072 A | 6/1978 | Erb | |
| 4,245,392 A | 1/1981 | Heller | |
| 4,620,431 A | 11/1986 | Muldoon | |
| 4,622,836 A * | 11/1986 | Long et al. | 72/31.02 |
| 4,640,017 A | 2/1987 | Cukon | |
| 4,750,537 A * | 6/1988 | Green | 144/363 |
| 5,327,766 A | 7/1994 | Humphreys | |
| 5,421,098 A | 6/1995 | Muldoon | |
| 5,884,409 A | 3/1999 | Muldoon | |
| 5,974,645 A | 11/1999 | Currie | |
| 6,260,250 B1 | 7/2001 | Hall et al. | |
| 7,010,965 B2 * | 3/2006 | Cameron | 73/65.03 |

OTHER PUBLICATIONS

Website, "http://www.golfmechanix.com/", lie and loft bending gauge, one sheet, printed Dec. 19, 2004.
Website, "http://www.golfworks.com/item_disp.asp?pn=GAM", golf club machine, one sheet, printed Dec. 19, 2004.

* cited by examiner

*Primary Examiner*—Daniel C Crane
(74) *Attorney, Agent, or Firm*—Richard C. Litman

(57) ABSTRACT

The golf club hosel bending fixture immovably secures a golf club head therein in order to adjustably bend the hosel angle of the club head to "fine tune" the characteristics of the club. The fixture includes an angularly articulating crown jaw assembly, a relatively fixed lower jaw assembly generally opposite the crown jaw assembly, a longitudinally disposed back jaw assembly, and a club head face jaw disposed at the base of the crown jaw track in order to remain aligned with the crown jaw. The jaw clamp and base mechanisms are laterally symmetrical, in order to provide for both left- and right-hand club heads. Two orthogonal gauges are provided to check both loft and lie angles of the hosel relative to the club head and face. The gauges may be adjustably positioned to either side of the fixture, to check either left- or right-hand club heads.

17 Claims, 6 Drawing Sheets

GOLF CLUB HOSEL BENDING FIXTURE

BACKGROUND OF THE INVENTION

1. Field of the Invention

The present invention relates generally to gauges and fixtures used for the adjustment of various tools and equipment, particularly those used in various sports. More particularly, the present invention is a fixture that securely and immovably clamps the head of a golf club therein to permit the hosel of the head to be bent as required to adjust the loft, lie, and/or face angle of the club head relative to the shaft.

2. Description of the Related Art

Golf has become an increasingly popular pastime for a large number of individuals, and many people play the game professionally as tournament players or as club or teaching professionals. The game is a very serious hobby, if not a profession, for a large number of people, and most of these serious players desire to gain every technical advantage possible with their equipment.

It has long been known that relatively fine adjustments in the angle of the club head as it strikes the ball during play will produce relatively large effects in the flight path of the ball. Accordingly, golf clubs are conventionally configured with different loft angles for the club faces, different shaft or hosel angles and junctures with the club heads, different club head masses, etc., in order to optimize the swing and flight path of the ball for individual golfers. Yet, in many (perhaps most) instances, the finite differences between clubs, e.g., the difference in loft angles between a four iron and a five iron, may be too large for the discerning player who requires a club having characteristics between two such clubs. This may be even more true of other club characteristics, such as the lie angle between the longitudinal axis of the club head and the club shaft, which must vary with the length of the club shaft and the height and stance of the golfer.

As a result of the above considerations, a number of different devices have been developed for bending the hosel or shaft attachment of a golf club head, to produce clubs with finely tuned characteristics suited to the individual using those clubs. These devices generally include some form of vise or clamp to grip the club head, and may include an integral bending tool and/or gauge to measure the angle or bend in at least one axis or plane. Alternatively, the bending tool and gauge may be provided as separate devices.

Such devices generally have only a single clamp or vise and fail to secure the club head adequately to hold the head stationary while the bending force is applied to the hosel. Many such devices require a series of chocks or shims, which fit between the club head and the jaw of the clamp in order to hold the club head securely. The vast number of different club head configurations requires a correspondingly large number of differently shaped chocks or shims in order to secure virtually any club head in the device.

Such devices also do not provide for securing, adjusting, and checking the hosel angle of a left-hand golf club head. While left-handed clubs are a relatively small percentage of the golf clubs manufactured and sold throughout the U.S. and world, they nevertheless exist, and the lack of suitable fixtures or devices for making and measuring fine adjustments in such clubs puts the left-handed golfer at a serious disadvantage.

Thus, a golf club hosel bending fixture solving the aforementioned problems is desired.

SUMMARY OF THE INVENTION

The golf club hosel bending fixture comprises a base plate with an angularly articulating upper or crown jaw assembly, an adjustably positionable sole jaw or club head cradle assembly generally opposite the crown jaw assembly, a longitudinally disposed back jaw assembly, and a club head face jaw adjustably disposed along the base of the crown jaw track in order to remain aligned with the upper jaw. These four jaw assemblies serve to clamp a golf club head securely in place within the fixture, and can accommodate virtually any "metal wood" type club head configuration, e.g., drivers and the like. The clamp jaws may also be adapted for securing iron type club heads as well.

The longitudinally positionable back jaw assembly is articulated in two mutually orthogonal axes in order to apply optimal pressure to the back of the club head regardless of the club head shape or configuration. The angularly articulating crown jaw assembly and club face jaw provide adjustment for different loft angles of different clubs, e.g., drivers, three woods (or "metal woods"), etc., in order to assure that the club face jaw seats flat against the face of the club. Each of the jaws includes some form of resilience in order to avoid damage to the club head clamped therein.

The fixture also includes an integral gauge or protractor assembly for checking the hosel angle in two mutually orthogonal axes. The gauge assembly does not provide an absolute measurement, but rather allows the technician to check the hosel angle of a club head secured within the device both before and after making a hosel bend adjustment, in order to determine the actual amount of bend made during the adjustment. The gauge assembly is positionable from one side of the device to the other, which, along with the laterally symmetrical clamp assemblies, allows the fixture to be used with both left- and right-handed club heads.

The device is used by removing the shaft from the club head and securing the head immovably within the fixture by means of the clamping jaws. The hosel angle may be checked with the gauge assembly by temporarily inserting the club shaft (or suitable straight rod or shaft) in the hosel. A suitable bending tool is applied to the hosel to produce the desired bend in either the longitudinal or lateral planes, or some combination thereof. The shaft is reinserted in the hosel, and the gauge assembly is used to check the amount of bend that has been applied. The process may be repeated as required until the desired hosel angle has been achieved.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention is a fixture for immovably securing a golf club head in order to bend the hosel of the head slightly to adjust the characteristics of the golf club, i.e., lie, loft, and face angles. Optimum angles are often found between the incremental steps between different clubs as manufactured, and the present fixture provides a means of holding the club head securely for angular adjustment of the hosel relative to the club head. The present fixture is particularly well-adapted for use with so-called "metal wood" type clubs, i.e., relatively large club heads having the general shape and configuration of traditional wood headed clubs, but being formed of metal. However, the present fixture is also adaptable for use with conventional irons as well.

Figure 1:
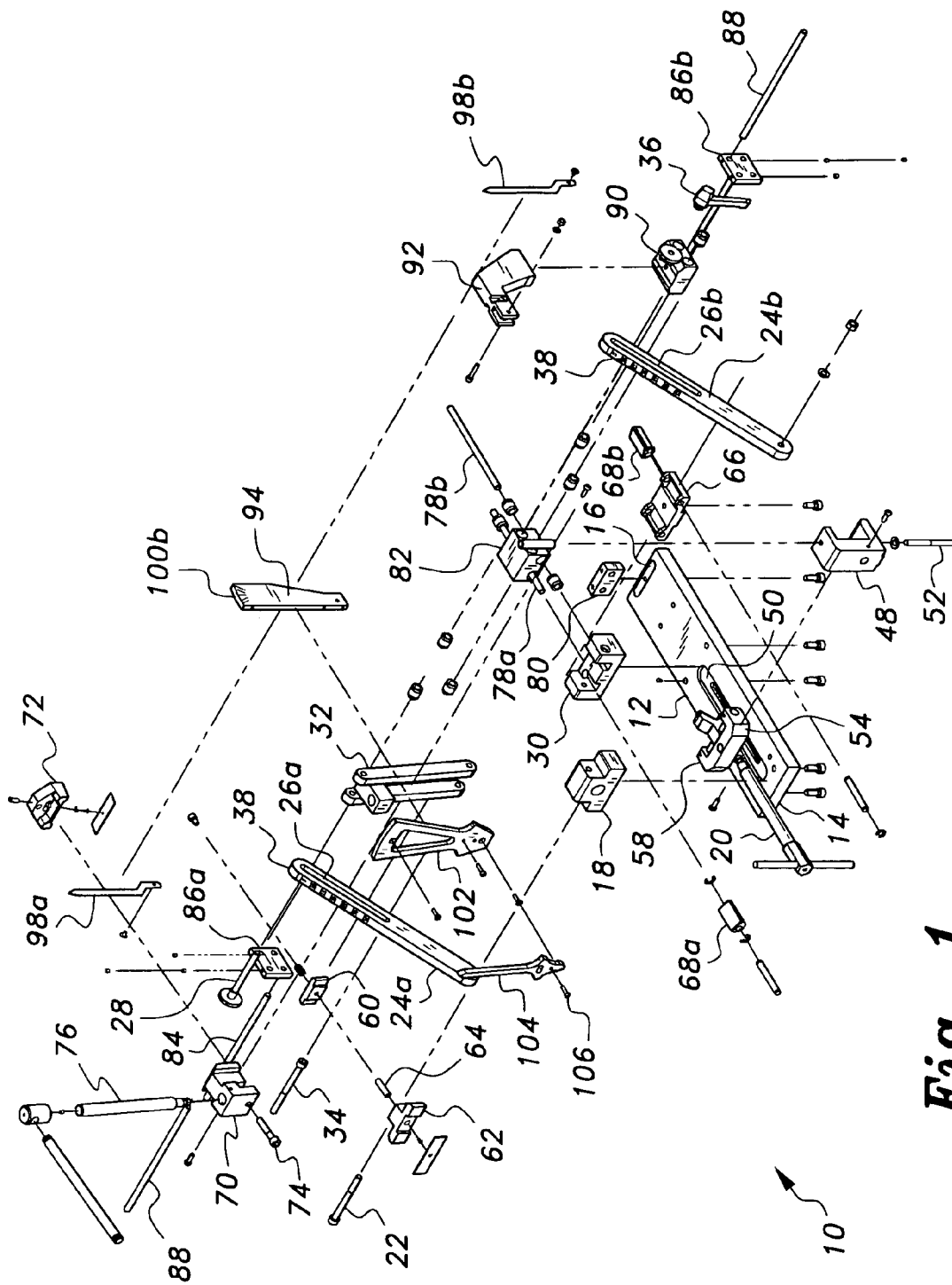
FIG. 1 is an exploded perspective view of a golf club hosel bending fixture according to the present invention, illustrating the various components thereof and their relationships to one another.

FIG. 1 of the drawings is an exploded perspective view of the components forming the present fixture 10, with the remaining drawings illustrating its operation and use. The present fixture 10 includes an elongate base plate 12 with a back jaw mount end 14 and an opposite gauge mount end 16, with the rest of the mechanism mounted atop the base plate.

A back jaw block 18 is immovably affixed (e.g., bolted, etc.) to the back jaw end 16 of the base plate 12, and supports a jack screw 20 threaded therethrough and having an advance axis parallel to the plane of the base plate 12. The back jaw block 18 also has a lateral pivot 22 passing therethrough, which pivotally secures a pair of laterally opposed, angularly articulating first and second loft adjustment arms 24a and 24b to each side of the back jaw block 18. The loft adjustment arms extend from the back jaw block 18, with each arm including a crown jaw slide attachment slot, respectively 26a and 26b, in its distal end portion, through which a lateral crown jaw slide attachment pin 28 is adjustably installed.

A crown jaw track block 30 is immovably affixed (bolted, etc.) to the general medial area of the base plate 12, spaced apart from the back jaw block 18. The length or span of the base plate 12 extending between the back jaw block 18 and the crown jaw track block 30 defines one fixed length leg of an adjustable triangle for adjusting the angle of a face jaw which engages the face of a club head installed in the present fixture, as described further below. A crown jaw track 32 is pivotally affixed to the crown jaw track block 30 by a lateral crown jaw track pin 34. The upper or distal end of the crown jaw track 32 is adjustably captured between the distal end portions of the two loft adjustment arms 24a and 24b by the attachment pin 28 which passes through the adjustment or attachment slots 26a and 26b of the arms 24a and 24b. The length of the crown jaw track 32 is also fixed, but the effective lengths of the loft adjustment arms 24a and 24b may be adjusted by adjusting the position of the lateral attachment pin 28 by means of the locking handle 36, thereby adjusting the loft angle of the crown jaw track 32 for proper fit of the face jaw against the face of the club head placed within the device, depending upon the loft angle of the club face. Each arm 24a and 24b includes an index or scale 38 thereon, to indicate the loft angle of the face of the club secured in the fixture 10.

A series of four independently positionable jaws are provided to contact and grip a club head positioned within the fixture 10. These jaws comprise a linearly adjustable back jaw 40 assembly and a linearly and angularly adjustable face jaw assembly 42 (most clearly shown in FIG. 5) generally horizontally opposite the back jaw, a linearly positionable sole jaw assembly 44, and a linearly and angularly positionable crown jaw assembly 46 opposite the sole jaw. Each of these jaw assemblies 40 through 46 includes articulation and/or resilience to conform to the contours of the specific club head secured within the fixture 10.

Figure 5:
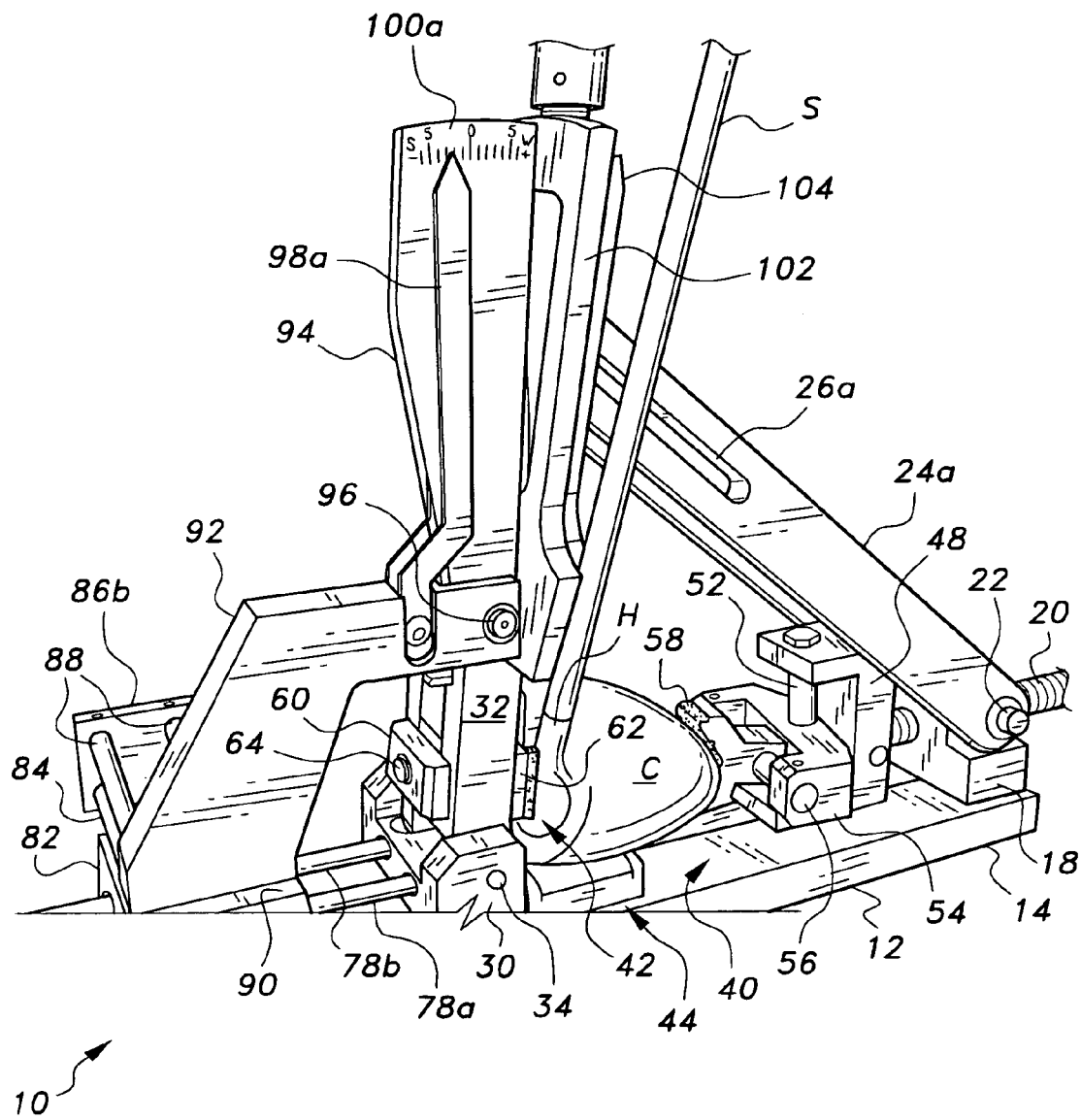
FIG. 5 is a detailed environmental perspective view of the loft angle gauge subassembly provided with the present fixture, showing its use and operation.

The back jaw assembly 40 is most clearly shown in FIG. 5 of the drawings. The back jaw assembly 40 comprises a back jaw slide 48 which is threadably advanced and retracted by the back jaw jack screw 20 and which slides in a longitudinal track 50 (best shown in FIG. 1) formed in the base 12. The back jaw slide 48 includes a vertically disposed intermediate block locator pin 52, upon which an intermediate block 54 pivots and slides vertically. The intermediate block 54 includes a back jaw locator pin 56 thereacross and orthogonal to the intermediate block locator pin 52, with a generally L-shaped back jaw 58 rotatingly and slidably disposed upon the back jaw locator pin 56. Thus, the back jaw 58 is free to articulate in four degrees of freedom due to the linear and pivotal articulation provided by the two locator pins 52 and 56, as well as being linearly advanced and retracted by means of the jackscrew 20 to grip the back of a club head as desired. The back jaw 58, as well as other jaws which contact the club head C, preferably has a resiliently padded contact face (Neoprene®, etc.) to protect the club head C.

The opposite face jaw assembly 42 is also best seen in FIG. 5 of the drawings. The face jaw assembly 42 comprises a retainer 60 and a face jaw 62, resiliently secured together to each side of the crown jaw track 32 by a bolt or other fastener 64 and spring assembly which passes between the two legs of the crown jaw track 32. The fastener and spring assembly 64 cause the retainer 60 and face jaw 62 to grip the two legs of the crown jaw track 32, thereby holding the face jaw 62 in position as desired. However, the retainer 60 and face jaw 62 may be adjustably positioned upwardly or downwardly along the crown jaw track 32 as desired, to align the face of the face jaw 62 with the face of a club head C secured within the fixture 10. The face jaw 62 is further adjusted angularly to accommodate the face angle of the club head C installed within the fixture 10 according to the angle of adjustment of the crown jaw track 32, which is adjusted as required for the face angle of the club head C. The face jaw 62 includes a resilient pad thereon, as shown in FIG. 5. The resilient pad is disposed over a relatively thin spring plate, which extends across the face jaw 62, to allow the jaw 62 to conform to the contours of the face of a club head secured within the fixture 10.

The sole jaw assembly 44 slides longitudinally along the track 50 formed in the base 12, between the stationary crown jaw track block 30 and the adjustably positionable back jaw assembly 40. The sole jaw assembly 44 includes a slide plate 66, upon which is mounted a pair of laterally opposed pivoting jaws 68a and 68b. These components 66 and 68 may be seen in FIG. 1. The two jaws 68a, 68b pivot to accommodate the curvature of the sole of the club head C secured within the fixture 10. As in the case of the other club head contact jaw assemblies of the present club head hosel adjusting fixture, the jaws 68a and 68b are resiliently padded to avoid marring the club head.

A fourth jaw assembly, i.e., a crown jaw assembly 46, is slidably disposed opposite the sole jaw assembly 44 along the crown jaw track 32 between the upper end of the crown jaw track 32 with its arm attachment pin 28 and the face jaw assembly 42. The crown jaw assembly 46 comprises a crown jaw slide 70 captured in the slot between the two sides of the crown jaw track 32, with a crown jaw 72 pivoting laterally on the crown jaw slide 70 by means of a crown jaw pivot pin 74. These components 70 through 74 are most clearly shown in the exploded view of FIG. 1 and in FIGS. 2-4 and 6. The crown jaw assembly is tightened against the golf club head C by a threaded crown jaw jack screw 76 which threads through the upper block of the crown jaw track 32 to advance and retract the crown jaw slide 70 along the crown jaw track 32 opposite the sole jaw assembly 44.

The four above-described jaw assemblies are generally deployed at 90° degrees to one another (depending primarily upon the angle at which the crown jaw track 32 is set in order to match the angle of the club face) and serve to clamp a golf club head C securely therein. The linear and/or angular articulation of the various jaws 58, 62, 68, and 72 assure that a golf club head C clamped within the fixture 10 will be securely held therein, regardless of the specific shape or curvature of the various surfaces or areas of the club head. The back jaw and crown jaw jack screws 20 and 76 are adjusted toward the respectively opposed face jaw 62 and sole jaw 68 to clamp a club head C securely within the fixture 10, assuring that the club head C cannot move when a bending force is applied to the hosel H of the club head in order to adjust the angle of the hosel relative to the club head C and its face.

The present fixture 10 does not provide an absolute measurement or indication of the angular relationship between the hosel H and any of the planes of the club head C. However, it does include two mutually orthogonal club shaft angle gauges or protractors, which are used to check this angular relationship initially before any bending adjustment is made, and again after any bending adjustment is made in order to measure the angle of the bending adjustment in either or both of two planes. These two club shaft angle gauges are mounted upon a series of mutually orthogonal rods to provide longitudinal and lateral adjustment, in order to allow for adjustment of the angle of the crown jaw track assembly for different club head face angles and to allow the fixture 10 to be used for both left- and right-hand clubs.

The two club shaft angle gauges or protractors are mounted upon a pair of laterally spaced, parallel, immovably affixed base block rods 78a and 78b, which extend between the crown jaw track block 30 and a gauge mount block 80 (shown in the exploded view of FIG. 1) immovably affixed to the gauge mount end 16 of the base plate 12. These two rods 78a and 78b are best viewed in FIG. 5 of the drawings. A longitudinally positionable base block 82 includes a pair of parallel passages with linear bearing inserts, through which the base block rods 78a and 78b pass to secure the base block 82 to the base plate 12. However, the base block 82 is free to slide longitudinally along the two base block rods 78a and 78b, to allow the club shaft angle gauges to be positioned as required.

The two club shaft angle gauges are supported by a lateral slide assembly, which is in turn supported by the club shaft angle gauge base block 82. The base block 82 includes a pair of parallel, laterally disposed passages therethrough, again with linear bearing inserts, with a pair of laterally disposed lower lateral slider rods 84 (at least one of which is shown in each view) slidably disposed through the base block passages and normal to the longitudinal base block rods 78a, 78b. The base block lower lateral slider rods 84 are held in place in the base block 82 by a retainer plate at each end of the rods, respectively noted as plates 86a and 86b.

A second pair of parallel rods, i.e., first and second gauge support block rods 88, are also immovably affixed to the two end plates 86a and 86b, but pass above the base block 82. The two end plates 86a, 86b hold all four of the rods 84 and 88 in an immovably affixed and parallel relationship to one another, but it will be seen that since the lower lateral slider rods 84 are free to slide laterally through the linear bearings of the passages in the gauge base block 82, the upper lateral rods, i.e., the gauge support block rods 88, also move laterally with movement of the lower rods 84. A gauge support block 90 is slidably disposed upon the two upper or gauge support block rods 88, which in turn supports a cantilever club shaft angle gauge arm 92. It will be seen that this arm 92 is free to move laterally and linearly to the extent of very nearly twice the length of the lateral rods 84 and 88, limited only by the widths of the base block 82 and support block 90 and the spans of the rods 84 and 88 and their retainer plates 86a and 86b. However, the parallel relationship of the rods 84 and 88, and the tight tolerances of the various linear bearings within the passages through the base block 82 and gauge support block 90, preclude any appreciable angular movement of the arm 92.

The club shaft angle gauge arm 92 supports a club shaft loft angle gauge 94, which is pivotally attached to the distal end of the gauge arm 92 by a lateral pivot 96 (FIG. 5). A pair of fixed pointers or indicators 98a and 98b are immovably affixed to each side of the gauge arm 92, with each side of the loft angle gauge 94 having a scale 100a and 100b disposed thereon. The scales 100a and 100b move angularly beneath the relatively fixed indicators 98a and 98b as the loft angle gauge 94 pivots angularly about its lateral pivot 96 to adjust to the angle of the shaft S of a club head C affixed within the fixture 10, which process is explained in more detail further below.

The loft angle gauge 94, in turn, has a club shaft lie angle gauge 102 immovably affixed to the forward edge thereof, i.e., adjacent the crown jaw track 32. A lie angle indicator 104 is pivotally secured to the lie angle gauge 102, and thus to the loft angle gauge 94 to which the lie angle gauge 102 is affixed, by a longitudinally disposed lie angle pivot pin 106 so that the pivot axis of the lie angle indicator 104 is orthogonal to the pivot axis of the loft angle gauge 94. A lie angle scale 108 is provided at the top of the lie angle gauge plate 102, with the lie angle indicator 104 providing an indication on the lie angle gauge scale 108 of the lie angle between the club head C and hosel H for a club head secured in the fixture 10.

Figure 2:
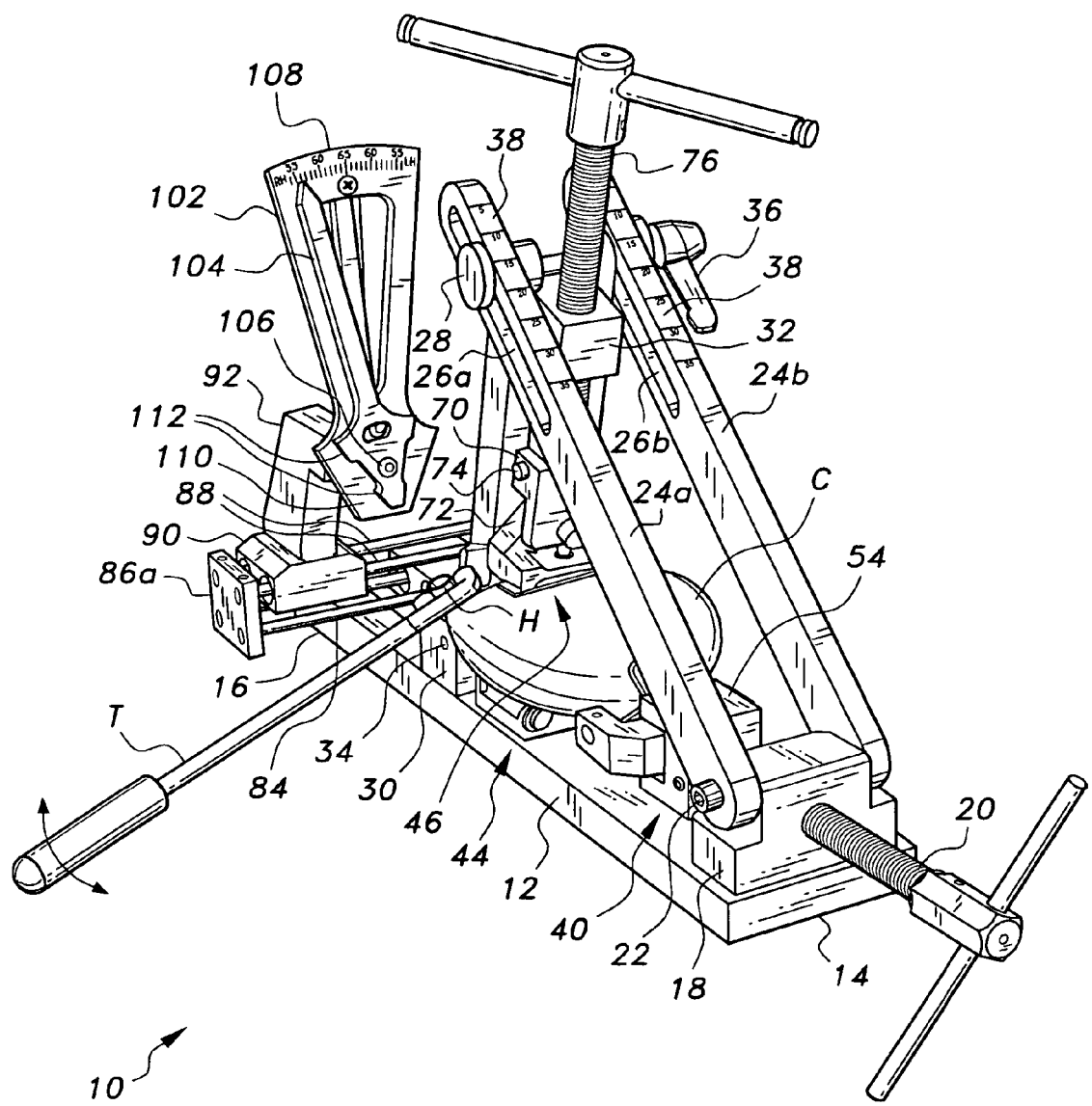
FIG. 2 is an environmental perspective view of the assembled golf club hosel bending fixture with a golf club head shown clamped therein, showing the bending adjustment of the club head hosel.

FIG. 2 illustrates the bending adjustment of the hosel H of a club head C secured within the fixture 10 using a conventional hosel bending tool T. In FIG. 2, the hosel bending tool T is shown applied to the hosel H, with motion of the tool handle T in the vertical plane. This adjustment primarily affects the lie angle of the club, i.e., the angle between the major plane of the club head and the club shaft.

Figure 3:
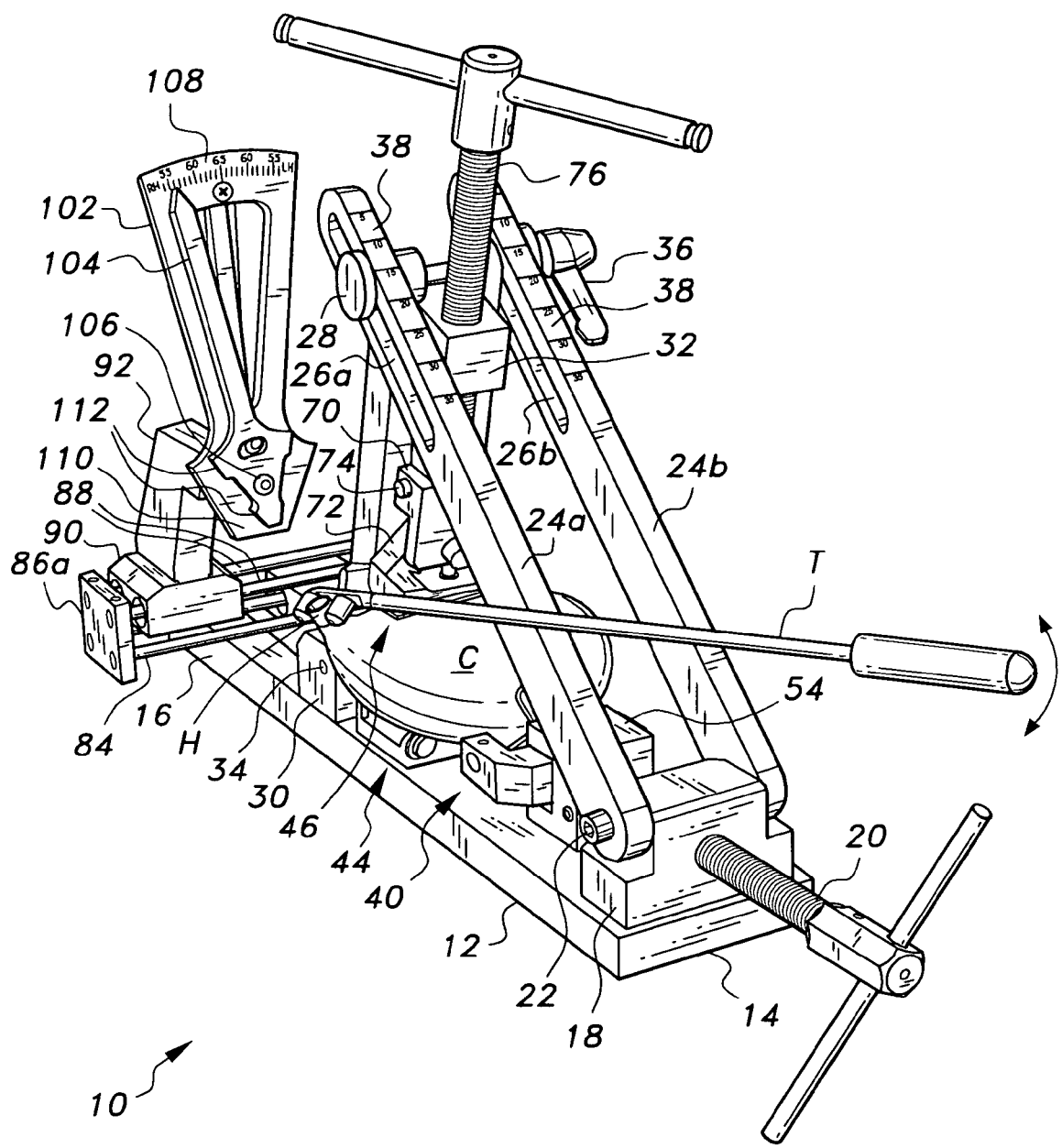
FIG. 3 is an environmental perspective view of the present golf club hosel bending fixture, showing the bending adjustment of a club head hosel in a plane generally orthogonal to that shown in FIG. 2.

In FIG. 3, the hosel bending tool T has been turned approximately ninety degrees, so that it is more or less parallel to the length of the elongate base of the fixture 10. This orientation is used to apply a bending force to the hosel H that primarily affects the loft or vertical face angle of the club head C. However, it will be seen that such an adjustment will also have some effect upon the horizontal face angle of the club head C relative to the shaft, due to the obtuse angle of the hosel H relative to the major plane of the club head C. Thus, such an adjustment may be used to adjust the horizontal face angle of the club head C to adjust any draw/hook or fade/slice tendencies, as desired. In other words, the horizontal and vertical face angles of the club head C are interrelated due to the obtuse angle of the hosel H relative to the major plane of the club head C. Accordingly, the golf club technician using the present fixture may make subtle adjustments in the hosel angle in either, or both, planes shown in FIGS. 2 and 3, or some intermediate orientation, as required to achieve the desired results.

Figure 4:
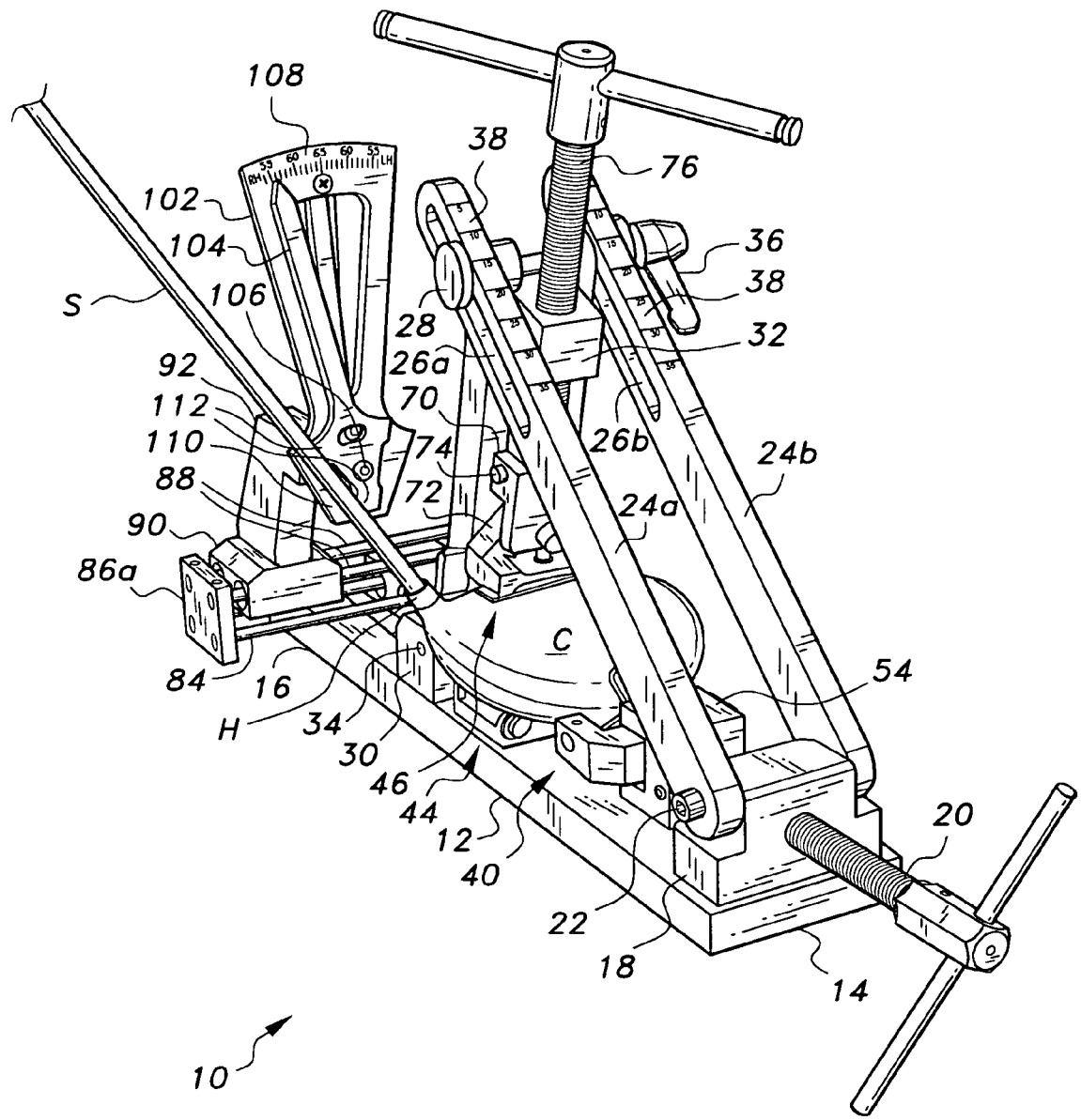
FIG. 4 is an environmental perspective view of the present golf club hosel bending fixture, showing the checking of the hosel angle using the lie angle gauge provided with the device.

In FIG. 4, the golf club shaft S (or other suitable straight rod or shaft) has been temporarily installed within the hosel H of the club head C in order to determine the change in hosel angle which has been accomplished according to the procedure shown in FIGS. 2 and 3. (The relative hosel angle is also checked initially according to the procedure shown in FIGS. 4 and 5 before any bending adjustment of the hosel is made, in order to compare the hosel angle before and after adjustment.) Checking the hosel angle is accomplished by sliding the loft and lie gauge base block 82 along the longitudinal base block rods 78 until the contact face 110 of the lie angle gauge 102 meets the club shaft S. (The gauge assembly may be adjusted laterally as required to position it for proper alignment with the club shaft S.) The pivotally mounted lie angle gauge 102 is then pivoted to position the plane of the contact face 110 flush with the side of the club shaft S. This enables the loft angle of the club shaft S, with the newly adjusted hosel angle, to be checked using the loft angle scale 100a (shown in FIG. 5, for a right hand club).

Lie angle is checked by sliding the gauge support block 90 laterally along its supporting rods 88, and positioning the lower lateral rod pair 84 with their retainer plates 86a and 86b as necessary, to place the contact face 112 of the lie angle indicator 104 flush against the side of the club shaft S and checking the angle on the lie angle gauge 108. The two checks or measurements, i.e., on the loft angle gauge 100a (or mirror image 100b, for a left handed club) and lie angle gauge 108, may be accomplished simultaneously by nesting the club shaft S in the angle defined by the planes of the loft angle indicator contact face 110 and lie angle indicator contact face 112, generally as shown in FIGS. 4 and 5 of the drawings.

Figure 6:
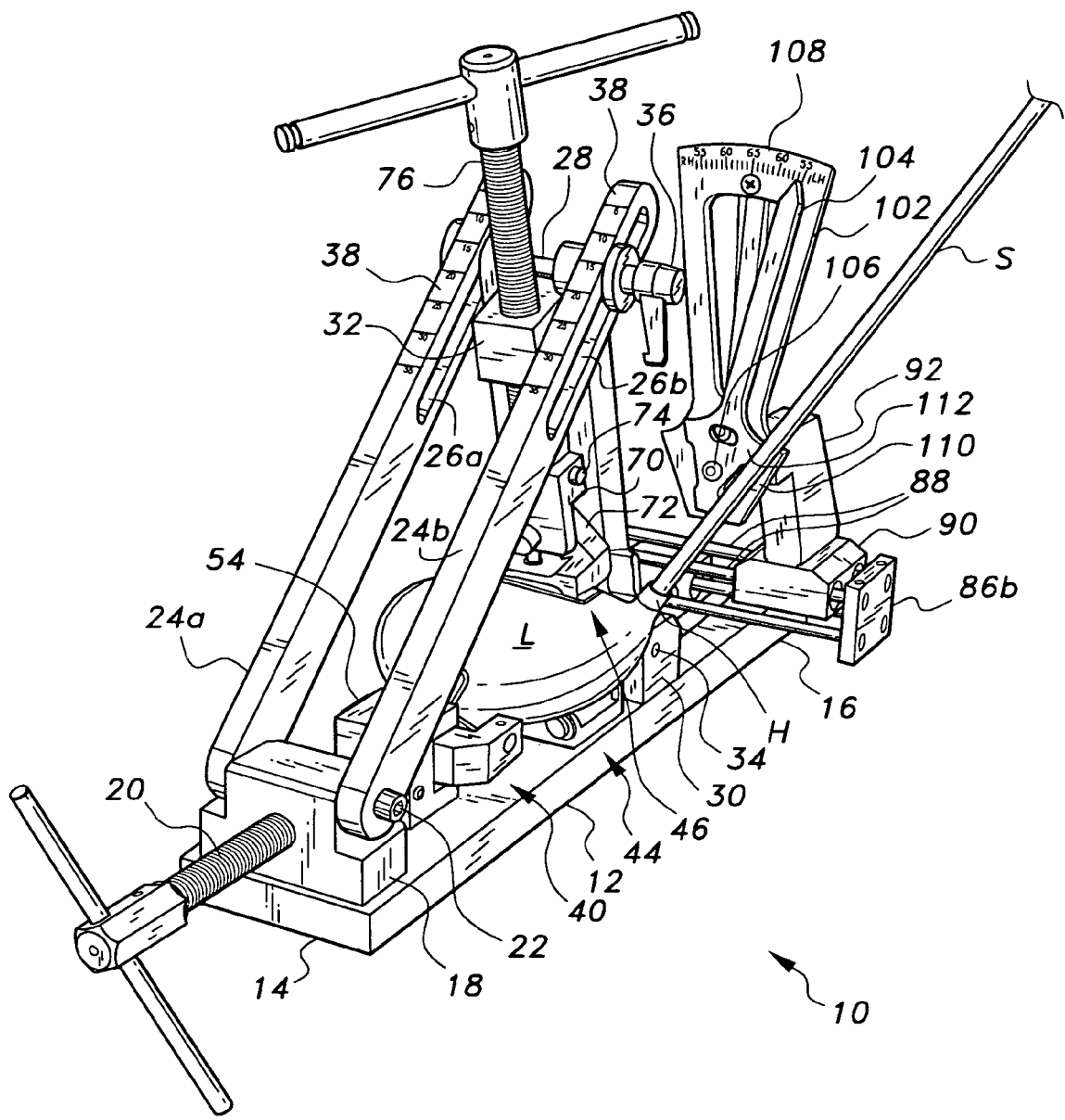
FIG. 6 is an environmental perspective view of the present golf club hosel bending fixture, being used to check and set the hosel bend of a left-hand golf club head.

The laterally symmetrical construction of the present fixture 10 (excepting the loft adjustment lock handle 36) enables the device to be used equally well with either left- or right-hand clubs. FIG. 6 provides an illustration of the use of the present fixture 10 in checking the loft and lie angles of a left-handed golf club head L. The left-hand club head L is installed in the fixture 10 in the same manner described further above for a right-handed club head C, i.e., loosening the two jack screws 20 and 76 as necessary, positioning the club head L between the various jaw assemblies 40 through 46, adjusting the crown jaw track 32 to place the face jaw 62 flat against the face of the club head L when the club head is seated upon the underlying sole jaws 68a and 68b, and positioning and tightening the back jaw assembly 40 and crown jaw assembly 46 to secure the left hand club head L in place. The laterally adjustable portion of the gauge assembly, i.e., the four lateral rods 84 and 88 with their gauge support block 90, gauge support arm 92, and loft and lie angle gauges 94 and 102, is repositioned laterally to place the loft and lie angle gauges to the opposite side of the fixture than as shown in FIGS. 2 through 5. The hosel angle may be checked before and after any bending adjustment of the hosel H, generally as shown in FIG. 6. The same scale 108 is used for checking the lie angle of both left- and right-hand club heads, with the mirror image loft angle scale 100b (shown generally in FIG. 1) being used to check the loft angle for the left-hand club head L.

In conclusion, the present golf club hosel bending fixture enables a technician to secure a metal wood type golf club head securely within the fixture, and to check the loft and lie angles of the club head secured therein. The technician may then apply an appropriate hosel adjustment tool to the hosel of the club head, to adjust the loft and/or lie angles of the club head as desired. The loft and lie angle scales provided allow the technician to accurately measure any changes made in the loft and lie angles of the hosel of the club head. The lateral symmetry of the present fixture enables the technician to adjust loft and lie angles of either left- or right-hand club heads with equal ease. It should also be noted that while the exemplary club heads shown and described herein are metal-wood type club heads, the various jaws of the present fixture may be revised and modified as required to secure iron type club heads therein, if so desired. Thus, the present golf club hosel bending fixture will prove to be a most valuable tool for use in golf pro shops and other operations where maintenance and adjustment of golf clubs is performed.

It is to be understood that the present invention is not limited to the embodiment described above, but encompasses any and all embodiments within the scope of the following claims.

I claim:

1. A golf club hosel bending fixture, comprising:
   an elongate base plate;
   a back jaw block immovably affixed to said base plate;
   angularly articulating, laterally opposed first and second loft adjustment arms pivotally attached to and extending from each side of said back jaw block;
   an angularly articulating crown jaw track extending between said base plate and said loft adjustment arms;
   a linearly adjustable back jaw assembly slidingly disposed along said base plate between said back jaw block and said crown jaw track;
   an adjustably positionable face jaw disposed upon said crown jaw track;
   a longitudinally positionable sole jaw adjustably disposed upon said base plate between said crown jaw track and said back jaw assembly; and
   a linearly adjustable crown jaw slidingly disposed along said crown jaw track opposite said sole jaw.

2. The golf club hosel bending fixture according to claim 1, further including:
   a longitudinally positionable club shaft angle gauge base block, disposed upon said base plate;
   a lateral slide assembly disposed atop said club shaft angle gauge base block;
   a gauge support block disposed upon said lateral slide assembly, said gauge support block being selectively positionable to either side of said base plate by means of said lateral slide assembly;
   a club shaft loft angle gauge pivotally disposed upon said gauge support block; and
   a club shaft lie angle indicator pivotally disposed upon said loft angle gauge, and orthogonal thereto.

3. The golf club hosel bending fixture according to claim 2, wherein said lateral slide assembly comprises:
- parallel, laterally disposed first and second base block lateral slider rods slidably disposed through said club shaft angle gauge base block;
- mutually opposite first and second end plates extending from said base block lateral slider rods; and
- parallel, laterally disposed first and second gauge support block rods extending between said first and second end plates, spaced apart from and parallel to said base block lateral slider rods, said gauge support block being slidably disposed upon said first and second gauge support block rods.

4. The golf club hosel bending fixture according to claim 1, further including:
- a crown jaw track block immovably affixed to said base plate, and spaced apart from said back jaw block, said crown jaw track being pivotally attached to and extending from said crown jaw track block;
- each of said loft adjustment arms further including a crown jaw track attachment slot therethrough; and
- a lateral pin passing through the slot of each of said loft adjustment arms and through said crown jaw track, with said crown jaw track being adjustably captured between said loft adjustment arms.

5. The golf club hosel bending fixture according to claim 1, wherein said back jaw assembly comprises:
- a back jaw slide;
- an advance screw extending through said back jaw block to said back jaw slide;
- an intermediate block locator pin disposed across said back jaw slide;
- an intermediate block slidingly and pivotally disposed upon said intermediate block locator pin;
- a back jaw locator pin disposed across said intermediate block and orthogonal to said intermediate block locator pin; and
- a back jaw slidingly and pivotally disposed upon said back jaw locator pin.

6. The golf club hosel bending fixture according to claim 1, wherein said back jaw assembly, said face jaw, said sole jaw, and said crown jaw each have a resilient club head contact face.

7. A golf club hosel bending fixture, comprising:
- an elongate base plate;
- an angularly articulating club head clamp assembly, disposed upon said base plate, wherein said club head clamp assembly comprises:
  - a back jaw block immovably affixed to said base plate;
  - a crown jaw track block immovably affixed to said base plate, and spaced apart from said back jaw block;
- angularly articulating, laterally opposed first and second loft adjustment arms pivotally attached to and extending from each side of said back jaw block;
  - each of said loft adjustment arms further including a crown jaw track attachment slot therethrough;
  - an angularly articulating crown jaw slide pivotally attached to and extending from said crown jaw track block; and
  - a lateral pin passing through the slot of each of said loft adjustment arms and through said crown jaw track, with said crown jaw track being adjustably captured between said loft adjustment arms;
- a longitudinally positionable club shaft angle gauge base block, disposed upon said base plate;
- a lateral slide assembly disposed atop said club shaft angle gauge base block;
- a gauge support block disposed upon said lateral slide assembly, said gauge support block being selectively positionable to either side of said base plate by means of said lateral slide assembly;
- a club shaft loft angle gauge pivotally disposed upon said gauge support block; and
- a club shaft lie angle indicator pivotally disposed upon said loft angle gauge, and orthogonal thereto.

8. The golf club hosel bending fixture according to claim 7, wherein said lateral slide assembly comprises:
- parallel, laterally disposed first and second base block lateral slider rods slidably disposed through said club shaft angle gauge base block;
- mutually opposite first and second end plates extending from said base block lateral slider rods; and
- parallel, laterally disposed first and second gauge support block rods extending between said first and second end plates, spaced apart from and parallel to said base block lateral slider rods, said gauge support block being slidably disposed upon said first and second gauge support block rods.

9. The golf club hosel bending fixture according to claim 7, further including:
- a linearly adjustable back jaw assembly slidingly disposed along said base plate, between said back jaw block and said crown jaw track block;
- an adjustably positionable face jaw disposed upon said crown jaw track block;
- a longitudinally positionable sole jaw adjustably disposed upon said base plate, between said crown jaw track block and said back jaw assembly; and
- a linearly adjustable crown jaw slidingly disposed along said crown jaw track block, opposite said sole jaw.

10. The golf club hosel bending fixture according to claim 9, wherein said back jaw assembly comprises:
- a back jaw slide;
- an advance screw extending through said back jaw block to said back jaw slide;
- an intermediate block locator pin disposed across said back jaw slide;
- an intermediate block slidingly and pivotally disposed upon said intermediate block locator pin;
- a back jaw locator pin disposed across said intermediate block, and orthogonal to said intermediate block locator pin; and
- a back jaw slidingly and pivotally disposed upon said back jaw locator pin.

11. The golf club hosel bending fixture according to claim 9, wherein said back jaw assembly, said face jaw, said sole jaw, and said crown jaw each have a resilient club head contact face.

12. A golf club hosel bending fixture, comprising:
- an elongate base plate;
- a back jaw block immovably affixed to said base plate;
- a crown jaw track block immovably affixed to said base plate, and spaced apart from said back jaw block;
- angularly articulating, laterally opposed first and second loft adjustment arms pivotally attached to and extending from each side of said back jaw block;
- each of said loft adjustment arms further including a crown jaw track attachment slot therethrough;
- an angularly articulating crown jaw track pivotally attached to and extending from said crown jaw track block;
- a lateral pin passing through the slot of each of said loft adjustment arms and through said crown jaw track, with said crown jaw track being adjustably captured between said loft adjustment arms;

a back jaw assembly disposed upon said base plate, between said back jaw block and said crown jaw track block;

a face jaw disposed upon said crown jaw track;

a sole jaw disposed upon said base plate, between said crown jaw track and said back jaw assembly; and a crown jaw disposed upon said crown jaw track, opposite said sole jaw.

13. The golf club hosel bending fixture according to claim 12, further including:

a longitudinally positionable club shaft angle gauge base block, disposed upon said base plate;

a lateral slide assembly disposed atop said club shaft angle gauge base block;

a gauge support block disposed upon said lateral slide assembly, said gauge support block being selectively positionable to either side of said base plate by means of said lateral slide assembly;

a club shaft loft angle gauge pivotally disposed upon said gauge support block; and a club shaft lie angle indicator pivotally disposed upon said loft angle gauge, and orthogonal thereto.

14. The golf club hosel bending fixture according to claim 13, wherein said lateral slide assembly comprises:

parallel, laterally disposed first and second base block lateral slider rods slidably disposed through said club shaft angle gauge base block;

mutually opposite first and second end plates extending from said base block lateral slider rods; and parallel, laterally disposed first and second gauge support block rods extending between said first and second end plates, spaced apart from and parallel to said base block lateral slider rods, said gauge support block being slidably disposed upon said first and second gauge support block rods.

15. The golf club hosel bending fixture according to claim 12, wherein:

said back jaw assembly is linearly adjustable and slidingly disposed along said base plate, between said back jaw block and said crown jaw track block;

said face jaw is adjustably positionable upon said crown jaw track;

said sole jaw is longitudinally positionable along said base plate, between said crown jaw track and said back jaw assembly; and said crown jaw is linearly and slidingly positionable along said crown jaw track, opposite said sole jaw.

16. The golf club hosel bending fixture according to claim 12, wherein said back jaw assembly comprises:

a back jaw slide;

an advance screw extending through said back jaw block to said back jaw slide;

an intermediate block locator pin disposed across said back jaw slide;

an intermediate block slidingly and pivotally disposed upon said intermediate block locator pin;

a back jaw locator pin disposed across said intermediate block, and orthogonal to said intermediate block locator pin; and a back jaw slidingly and pivotally disposed upon said back jaw locator pin.

17. The golf club hosel bending fixture according to claim 12, wherein said back jaw assembly, said face jaw, said sole jaw, and said crown jaw each have a resilient club head contact face.

* * * * *